US009761009B2

(12) United States Patent
Ben Dov et al.

(10) Patent No.: US 9,761,009 B2
(45) Date of Patent: Sep. 12, 2017

(54) MOTION TRACKING DEVICE CONTROL SYSTEMS AND METHODS

(71) Applicant: Sesame Enable Ltd, Kfar Sava (IL)

(72) Inventors: Oded Ben Dov, Kfar Sava (IL); Giora Livne, Haifa (IL)

(73) Assignee: SESAME ENABLE LTD., Kfar Sava (IL)

( * ) Notice: Subject to any disclaimer, the term of this patent is extended or adjusted under 35 U.S.C. 154(b) by 22 days.

(21) Appl. No.: 14/918,210

(22) Filed: Oct. 20, 2015

(65) Prior Publication Data

US 2016/0110881 A1    Apr. 21, 2016

Related U.S. Application Data

(60) Provisional application No. 62/065,998, filed on Oct. 20, 2014.

(51) Int. Cl.
*G09G 5/00*    (2006.01)
*G06T 7/20*    (2017.01)
*G06F 3/01*    (2006.01)
*G06T 7/00*    (2017.01)
*G06F 1/16*    (2006.01)

(52) U.S. Cl.
CPC ............ *G06T 7/204* (2013.01); *G06F 1/1686* (2013.01); *G06F 3/017* (2013.01); *G06T 7/0044* (2013.01); *G06T 2207/30241* (2013.01)

(58) Field of Classification Search
CPC ........ G06F 3/012; G06F 3/0485; G06F 3/017; G06F 3/0346; G06F 2200/1637
USPC .......................................... 345/156–158, 169
See application file for complete search history.

(56) References Cited

U.S. PATENT DOCUMENTS

2014/0320403 A1* 10/2014 Lee ........................... G06T 7/20
345/156
2015/0149956 A1* 5/2015 Kempinski ............. G06F 3/017
715/784

* cited by examiner

*Primary Examiner* — Jennifer Nguyen
(74) *Attorney, Agent, or Firm* — AEON Law; Adam L. K. Philipp

(57) ABSTRACT

Provided herein are systems and methods for controlling displacement of a location indicator on the display of a controlled computing device in response to movements of a remote controlling object. Various embodiments may further cause the controlled computing device to perform other operations, broadly referred to as command operations, in response to movements of the controlling object. The command operations are distinguishable from the displacement operations. Various embodiments may further distinguish between movement of the controlling object intended to correspond to a displacement operation and movement of the controlling object intended to correspond to a command operation.

18 Claims, 10 Drawing Sheets

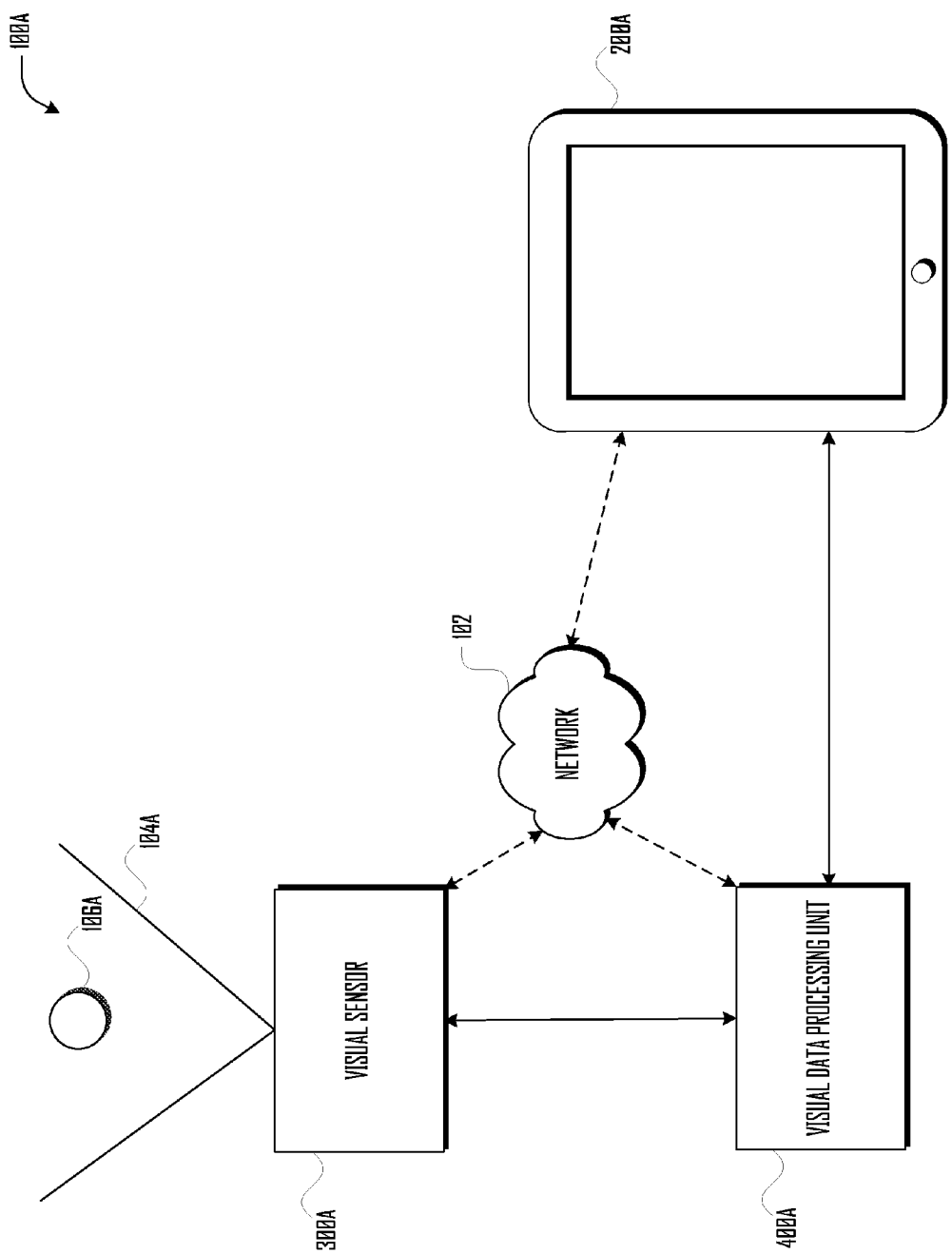

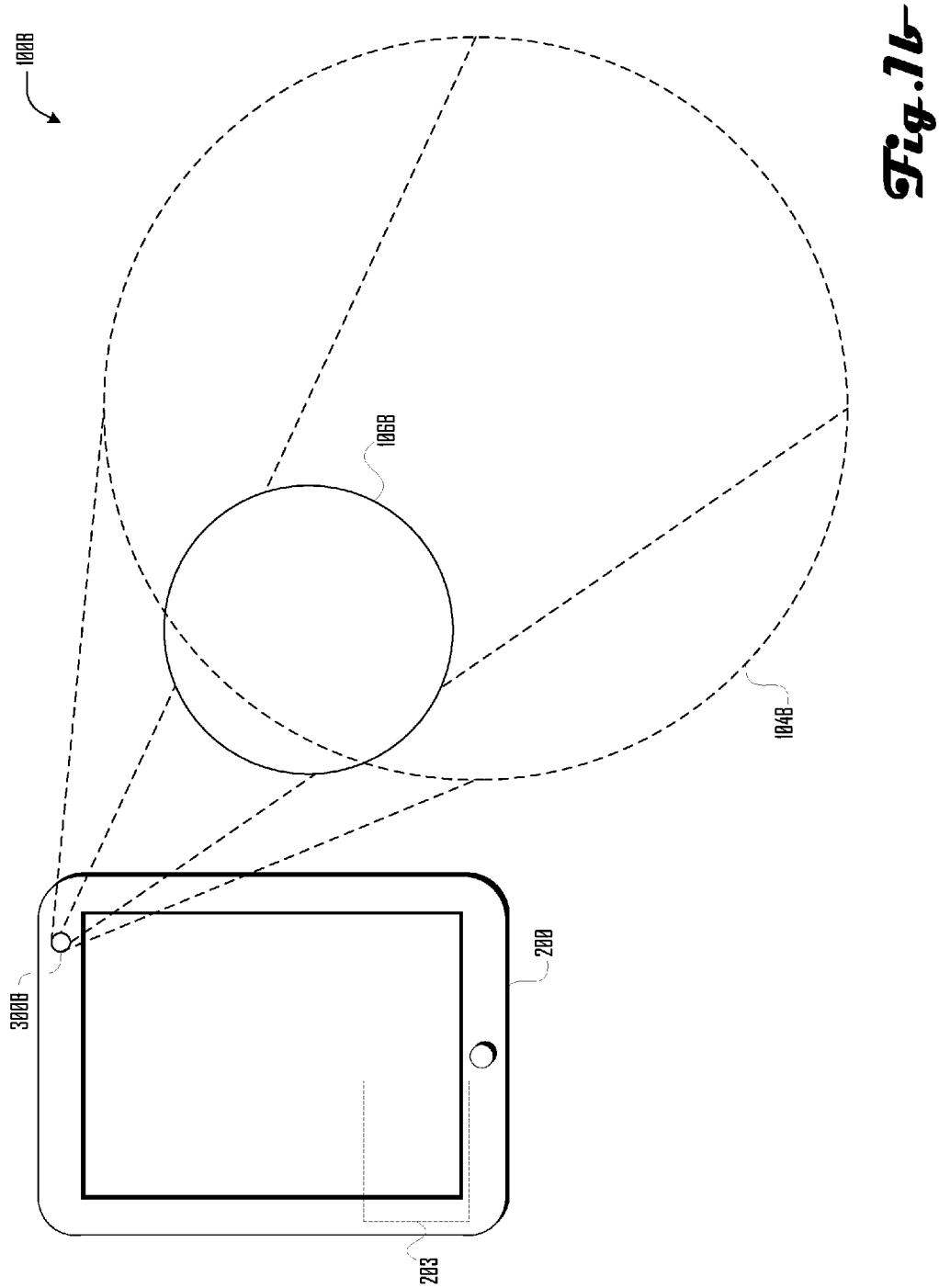

MOTION TRACKING DEVICE CONTROL SYSTEMS AND METHODS

CROSS-REFERENCE TO RELATED APPLICATIONS

This application claims priority to provisional application No. 62/065,998, entitled Controllable Devices and Methods for Controlling them, filed Oct. 20, 2014, the entire disclosure of which is incorporated herein for all purposes.

FIELD

The present disclosure relates to visual data interpretation and remote device control and more particularly, to systems and methods for analyzing a derived trajectory correlated to movement of a controlling object and providing control commands to a controlled object in response thereto.

BACKGROUND

Those versed in the art would appreciate that many devices exist including some devices that are configured to be controlled by a mouse, devices configured to be controlled by a touch sensitive surface, such as a touchscreen, and possibly other devices that are configured to be controlled by other input means. Touch sensitive surface enables a user to control the device by touching the surface with a touching element such as a pen, a stylus, and/or a finger. It is appreciated that the input obtained from a touch sensitive surface is different from the input obtained from a mouse or a similar pointing device in two major aspects. In one aspect, the input obtained from the mouse is continuous, and therefore the "mouse cursor" moves in a continuous mouse route on the screen. The input obtained from the touch sensitive surface, on the other hand, is not continuous, because the input is obtained only when the touching element is in contact with the surface. Therefore, the input obtained from the touch sensitive surface comprises disjoined segments corresponding to "touching periods", separated by "no touching periods". In another aspect, the input obtained from the mouse is relative, and indicates a movement of the "mouse cursor" relative to its current location. The input obtained from the touch sensitive surface, on the other hand, indicates an absolute location on the touch sensitive surface. Understanding this, it can be appreciated that upon touching the touch sensitive surface in order to perform an operation attributed to a certain location on the surface, the absolute location of the touch determines the certain location to which the operation should be attributed.

However, in a mouse controllable device, no such absolute location is provided upon pressing a mouse button for performing an operation. Therefore, in order to determine the absolute location, the location of the mouse cursor should be utilized. Without the mouse cursor the absolute location cannot be is determined, and without the mouse route, the location of the mouse cursor cannot be determined.

Presently in the art there are publications that present methods for recognizing images of objects in visual data, e.g., in a first paper "Struck: Structured output tracking with kernels" by Hare, Sam, Amir Saffari, and Philip HS Torr, in IEEE International Conference on Computer Vision (ICCV), 2011, pp. 263-27 ("Hare et al"), and in a second paper "Robust object tracking via sparsity-based collaborative model" by Zhong, Wei, Huchuan Lu, and Ming-Hsuan Yang, in IEEE Conference on Computer Vision and Pattern Recognition (CVPR), 2012, pp. 1838-1845 ("Zhong et al").

Hare et al present a framework for adaptive visual object tracking based on structured output prediction. By explicitly allowing the output space to express the needs of the tracker, they are able to avoid the need for an intermediate classification step. Their method uses a kernelized structured output support vector machine (SVM), which is learned online to provide adaptive tracking. To allow for real-time application, they introduce a budgeting mechanism which prevents the unbounded growth in the number of support vectors which would otherwise occur during tracking. They show that the algorithm is able to outperform trackers on various benchmark videos. Additionally, they show that they can incorporate additional features and kernels into their framework, which results in increased performance.

Zhong et al propose a robust object tracking algorithm using a collaborative model. As a for object tracking is to account for drastic appearance change, they propose a robust appearance model that exploits both holistic templates and local representations. They describe a sparsity-based discriminative classifier (SDC) and a sparsity-based generative model (SGM). In the SDC module, they introduce an effective method to compute the confidence value that assigns more weights to the foreground than the background. In the SGM module, they describe a histogram-based method that takes the spatial information of each patch into consideration with an occlusion handing scheme. Furthermore, the update scheme considers both the observations and the template, thereby enabling the tracker to deal with appearance change effectively and alleviate the drift problem.

BRIEF DESCRIPTION OF THE DRAWINGS

FIGS. 1a-b illustrate exemplary network topologies of an exemplary remote motion-tracking device control system in accordance with at least first and second embodiments.

DESCRIPTION

Figure 2:
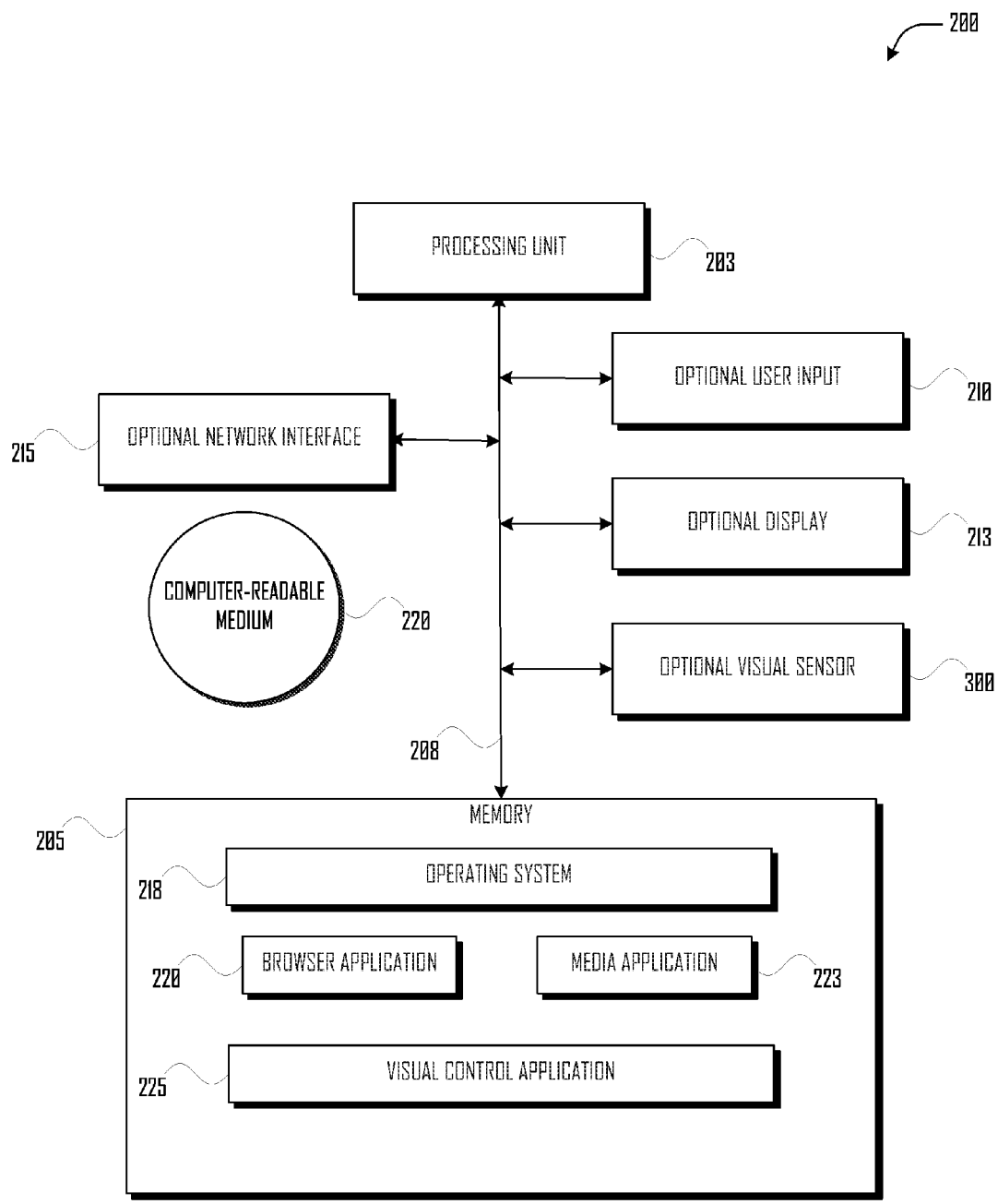
FIG. 2 illustrates several components of an exemplary controlled computing device in accordance with at least one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of a "smartphone" or "tablet" equipped with a forward facing camera. However, these embodiments are exemplary and are in no way limiting with respect to other embodiments that are within the scope of the Claims.

Exemplary Remote Motion-Tracking Device Control Systems

FIGS. 1a and 1b illustrate respective exemplary remote motion-tracking device control systems 100A and 100B in accordance with various embodiments. In both FIGS. 1a and 1b, a controlled device 102, 200 is in data communication with a visual sensor 300 via a visual data interpretation unit 400. As is explained in more detail below, visual sensor 300 has a field of view 104. A controlling object 106 may be positioned within field of view 104. In the embodiment illustrated in FIG. 1a, controlled device 102, visual sensor 300a, and visual data processing unit 400a are shown as physically separate components. In the embodiment illustrated in FIG. 1b, visual sensor 300b and visual data interpretation unit 400b are shown as sub-components of controlled device 200.

In the example shown in FIGS. 1a and 1b, controlled devices 200a-b are depicted as "smartphones" or tablet computing devices, each having a touchscreen 108 serving as a dual display/user data input. In various embodiments, a controlled device 200 may be a computing device having a form factor such as a general purpose computer (including "desktop," "laptop," "notebook," "tablet" computers, or the like); mobile phones; dedicated media players; motor vehicle head units; audio-video on demand (AVOD) systems; dedicated media consoles; or the like. Such a controlled device 200 may interchangeably be referred to as a controlled computing device 200. The functional components of an exemplary, form-factor-independent controlled computing device 200 are described below in reference to FIG. 2. The controlled device may also be a device designed for a specific task or for several specific tasks, such as an air-conditioner remote control, a television remote control, a programmable remote control, a control-panel of a dish washer machine or other appliance, a wired telephone device, a toy, an audio player, etc. In accordance with various embodiments, controlled device 200 may be controllable remotely, i.e. without making physical contact with input unit comprised in or coupled to the device, and, as is explained in more detail below, controlling object 106 may be referred to interchangeably as a remote controlling object 106.

In some embodiments, an otherwise conventional computing device, such as a "smartphone," a "tablet," or other personal computing device, having a processing unit and a "forward facing camera," may be adapted via executable instructions to become a controlled computing device wherein the processing unit and forward facing camera respectively act as visual data processing unit 400 and visual sensor 300 in a remote motion-tracking device control system.

Exemplary Controlled Computing Device

Referring to FIG. 2, several components of an exemplary controlled computing device 200 suitable for use in exemplary remote motion-tracking device control system 100B are illustrated. In various embodiments, a controlled computing device may include more components than those shown in FIG. 2. However, it is not necessary that all of these generally conventional components be shown in order to disclose an illustrative embodiment. As shown in FIG. 2, exemplary controlled computing device 200 includes a processing unit 203 and a memory 205 in data communication with one another via bus 208. Bus 208 also provides data communication between processing unit 203 and an optional user input 210 (e.g. an alphanumeric keyboard, keypad, and/or a touchscreen), an optional display 213 (e.g. a touchscreen), an optional visual sensor 300 (e.g. a camera), and an optional network interface 215.

The memory 208 of exemplary controlled computing device 200, which generally comprises a RAM, a ROM, and a permanent mass storage device, such as a disk drive, flash memory, or the like, stores an operating system 218 as well as program code for a number of software applications, such as, by way of example, a browser application 220, and/or a media application 223. Browser application 220 may be a software application for retrieving, rendering, and traversing information resources (e.g. web pages) on a network, such as network 108. Media application 223 may be a software application for finding, retrieving, and rendering copies of digital media files, either from memory 205 or from a network, such as network 108.

In operation, the operating system 220 manages the hardware and other software resources of the controlled computing device 200 and provides common services for software applications, such as browser application 221 and/or client media application 223. For hardware functions such as network communications via network interface 203, receiving data via input 210, outputting data via optional display 213 and/or optional speaker 215, and allocation of memory 208, operating system 220 acts as an intermediary between software executing on controlled computing device 200 and the hardware. (In the case of a web application, browser application 221 may similarly act as an intermediary between the web application's program code and the operating system 220.)

For example, operating system 220 may cause representations of available software applications (e.g. icons), such as browser application 220 and client media application 223, to be rendered on different spatial regions of display 213. Optional user input 210 may obtain data relating to an object contacting a particular spatial position on display 213 and communicate information about the spatial position to operating system 220. Operating system 220 may determine that the selected spatial region of the display corresponds to the spatial position of the representation of media application 223 being rendered on display and interpret the contact as indicating desire to access client media application 223. In the present example, wherein controlled computing device 200 includes a touchscreen that acts as a combined display/input, Operating system 218 may then responsively instantiate a media application process (not shown), i.e. cause processing unit 203 to begin executing the executable instructions of client media application 223 and allocate a portion of memory 205 for its use. The media application process may then, via operating system 218, cause representations of available media works to be rendered on display 213. Optional user input 210 may then again obtain data relating to an object contacting a particular spatial position on display 213 and communication the information to operating system 220. Because the media application process is currently controlling display 213, it may obtain the information relating to the selected spatial position from operating system 220. The media application process may, in turn, determine that the selected spatial region of the display corresponds to the location of the representation of a particular media work being rendered on display 213 and therefore interpret the contact as indicating desire for a copy of the selected media work to be rendered.

In accordance with various embodiments, the memory 208 of controlled computing device 200 may also store program code for a visual control application 225. Visual control application, the functionality of which is described in more detail below, may be a software application for: obtaining data relating to the relative spatial position and movement of a controlling object (also referred to interchangeably herein as "controlling object positional data"), such as controlling object 106B, via visual sensor 300; analyzing changes in the controlling object positional data over time; locating a spatial position on display 213 that corresponds to the controlling object's current position; determine whether changes in the controlling object positional data correspond to a navigational movement or a command movement; and, in the latter case, instruct operating system 220 to act as though the operating system had obtained data relating to an object contacting the located spatial position on the display.

Exemplary Visual Sensor

Figure 3:
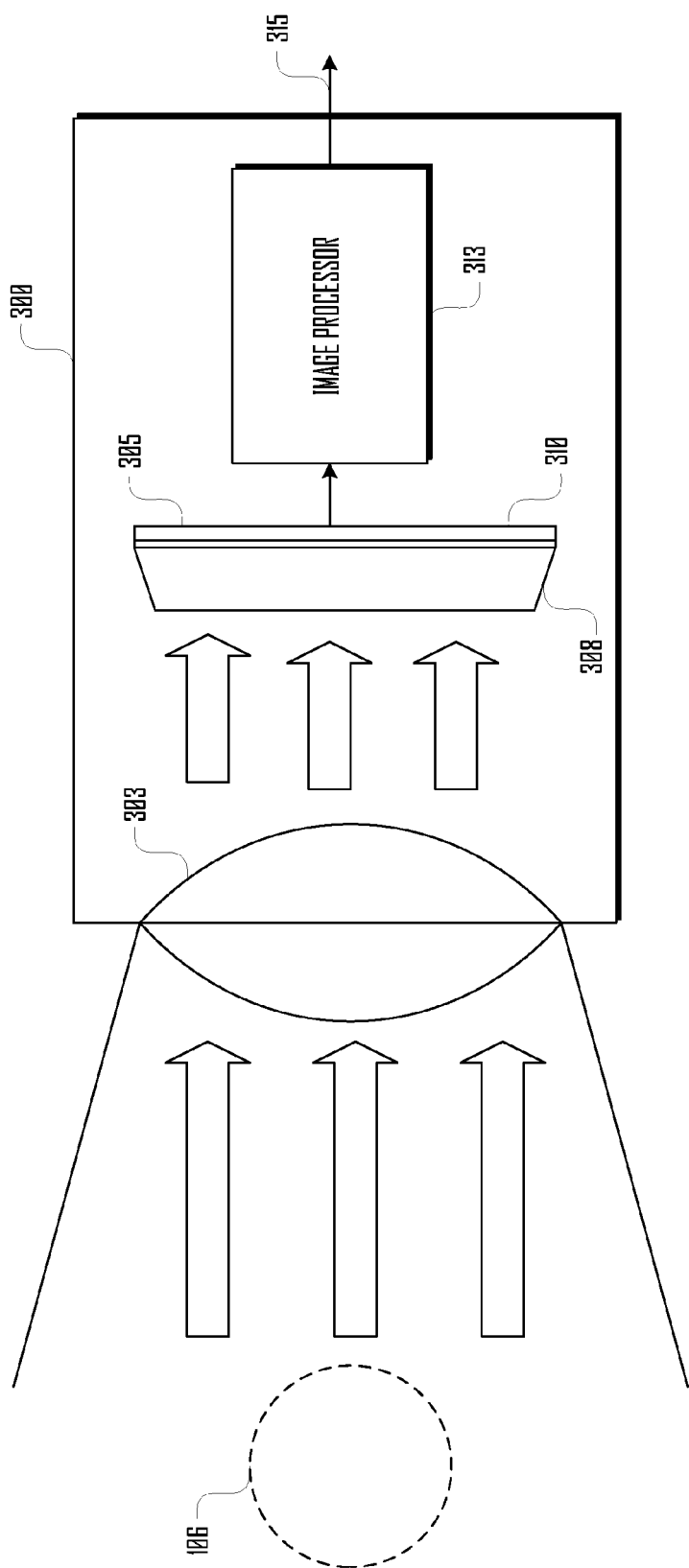
FIG. 3 illustrates several components of an exemplary visual sensor in accordance with at least one embodiment.

FIG. 3 illustrates a block diagram of an exemplary visual sensor 300 for use in accordance with various embodiments. A lens 303 is oriented outwardly from visual sensor 300. Light impinging on lens 303 passes into visual sensor 300 and is focused onto sensor array 305. Sensor array 305 may include a color filter array 308 overlaying a sensor grid 310. Sensor array 305 may generate electrical signals corresponding to the location of various light wavelengths impinging on sensor grid 310. The electrical signals may be provided to image processor 313 which converts the electrical signals into image data sets 315 (e.g. a series of JPEG files).

Exemplary Visual Data Processing Unit

Figure 4:
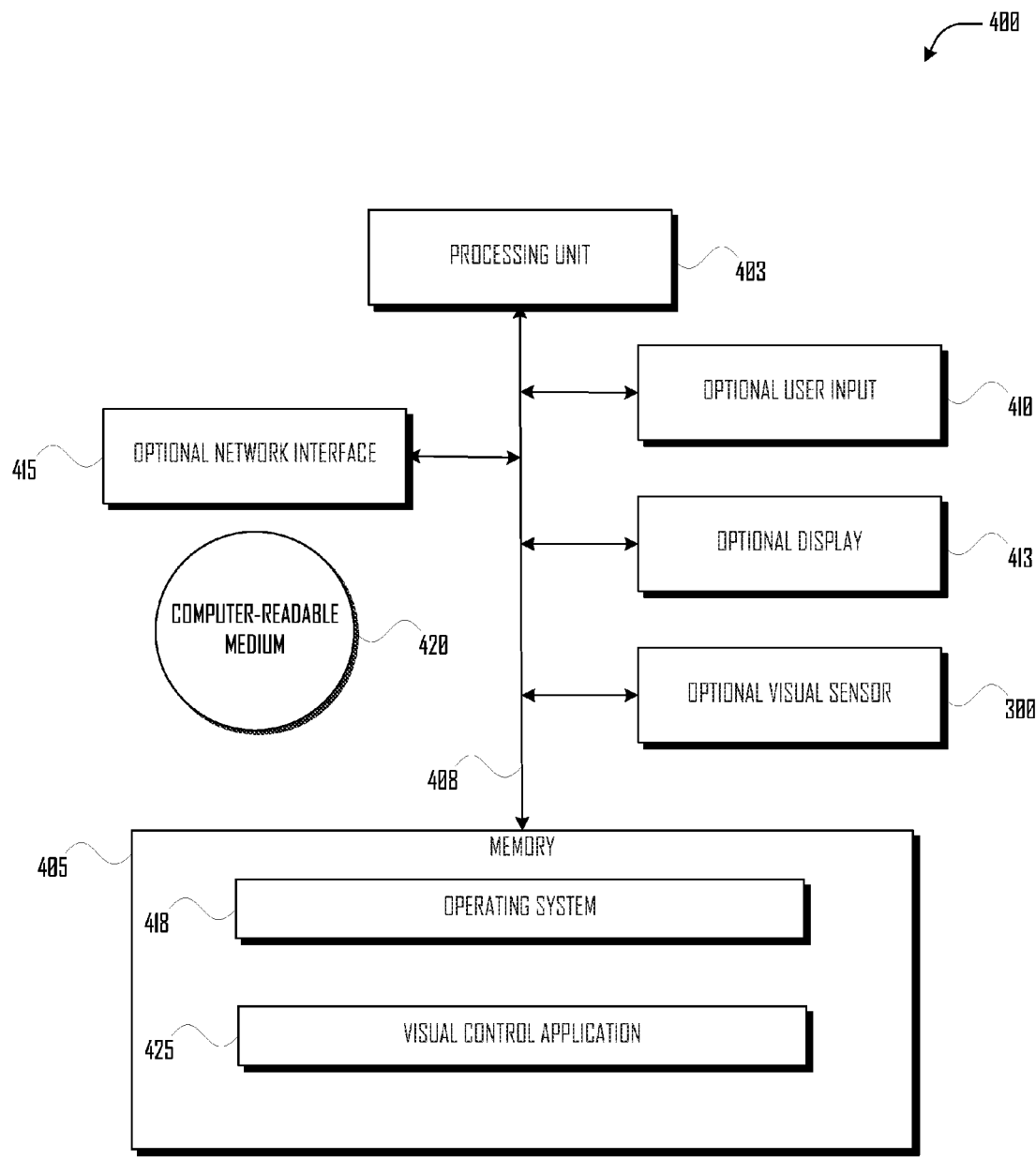
FIG. 4 illustrates several components of a visual data processing unit in accordance with at least one embodiment.

Referring to FIG. 4, several components of an exemplary visual data processing unit 400, suitable for use in exemplary remote motion-tracking device control system 100A, are illustrated. In various embodiments, visual data processing unit 400 may include more components than those shown in FIG. 4. However, it is not necessary that all of these generally conventional components be shown in order to disclose an illustrative embodiment. As shown in FIG. 4, exemplary controlled computing device 400 includes a processing unit 403 and a memory 405 in data communication with one another via bus 408. Bus 408 also provides data communication between processing unit 403 and an optional user input 410 (e.g. an alphanumeric keyboard, keypad, and/or a touchscreen), an optional display 413 (e.g. a touchscreen), an optional visual sensor 300 (e.g. a camera), and an optional network interface 415.

The memory 408 of exemplary controlled computing device 400, which generally comprises a RAM, a ROM, and a permanent mass storage device, such as a disk drive, flash memory, or the like, stores an operating system 418. In operation, the operating system 420 manages the hardware and other software resources of the controlled computing device 400 and provides common services for software applications, In accordance with various embodiments, the memory 408 of controlled computing device 400 may also store program code for a visual control application 425. Visual control application, the functionality of which is described in more detail below, may be a software application for: obtaining data relating to the relative spatial position and movement of a controlling object (also referred to interchangeably herein as "controlling object positional data"), such as controlling object 106B, via visual sensor 300; analyzing changes in the controlling object positional data over time; locating a spatial position on display 413 that corresponds to the controlling object's current position; determine whether changes in the controlling object positional data correspond to a navigational movement or a command movement; and, in the latter case, identify a corresponding command and communicate the corresponding command to a controlled device, e.g. via network interface 415.

General Description of the Exemplary Embodiments

Referring generally to FIGS. 1a-4, a controlled computing device 200 may configured in accordance with various embodiments to be remotely controlled by a user who may be unable to physically contact the device and/or exhibit the degree of fine motor control required to operate a conventional computing device, e.g. a user with cerebral palsy. Controlled computing device 200 may be disposed in front of a user's face, e.g. by mounting the controlled computing device to a wheelchair, bed, or other apparatus for supporting the user's frame, and visual control application 225 may enable the user to control the controlled computing device by capturing controlling object positional data corresponding to movements of a controlling object 106, which may be the user's head, eye, finger, or the like, and providing navigational commands and/or control commands to operating system 218 accordingly.

In particular, various embodiments may be useful is the area of improving accessibility to devices, such as controlled computing device 200, for users with various physical disabilities. For example, remote motion-tracking device control systems 100a-b may facilitate a person with limited fine motoric skills to use a personal computer, to control home appliances, to dial a smartphone, to control a motorized wheelchair, and the like. It is noted, however, that the examples listed herein are not limiting, and the methods and devices disclosed herein may be utilized for any other suitable application.

It should be further appreciated that in some cases, controlling object 106 may be an organ of a user of a controlled device. The organ of the user may be an eye, a face, a hand, a nose, a head, or any other organ of the user suitable for the case. Additionally or alternatively, in some cases, the controlling object may be an article moved by a user. In some cases, the article may be handheld by the user, while the user may move the article, e.g., by moving his hand. It may be further appreciated that instead of holding the article, it can be attached to the user's hand by any applicable and suitable technique. Holding is therefore considered as one way for attaching the article to the user's hand. Furthermore, it may be generally explained that in some cases, the article may be attached to an organ of the user, while the user may move the article by moving the organ. In some examples, the article may be attached to the head of the user, to the finger of a finger, or to whatever organ is best suited to the user for use as a controlling object.

In some embodiments of the present invention, the controlling object is selectable, i.e. remote motion-tracking device control system 100 may be configured by the user to operate with a controlling object selected and identified by the user.

Visual sensor 300 may obtain a sequential series of image data sets (frames) capturing image data from field of view 104 at discrete sequential points in time. The field of view of visual sensor 300 may be configured to cover the expected positions of controlling object 106 while in operation, and therefore the visual data produced by the visual sensor is expected to include a representation of the controlling object, although the representation of the controlling object may be missing from at least some of the visual data produced. Hence, in some embodiments, the visual data used in accordance with various embodiments may comprise a series of only those frames out where a controlling object representation appears, while in other embodiments the visual data may comprise a series of all the frames captured by visual sensor 300. It is noted that other applicable variants may exist as well, such as a series of only those frames out of the produced frames wherein the representation of the controlling object appears in focus etc. and some or all of the frames may comprise images of the controlling objects, i.e. regions representing the controlling object.

Furthermore, in some embodiments, visual sensor 300 is stationary, and its field of view is configured to be wide enough to cover the expected positions of the controlling object 106. In some cases, remote motion-tracking device control system 100 may further comprise a visual sensor controller (not shown), which is configured to change the field of view of the visual sensor, e.g. by rotating the visual sensor and/or possibly by zooming in and out, that is, changing the focal length of a lens comprised in the sensor or coupled thereto. In some embodiments, the visual sensor controller may be configured to change the field-of-view responsive to movements of the controlling object, so as to maintain coverage of the controlling object.

Further to the explanation provided above, it is now understood that the visual data obtained from visual sensor 300 may comprise a representation of the controlling object. Accordingly, the visual data may be analyzed for recognizing the representation of the controlling object and for tracking the position or orientation of the representation, i.e., tracking exclusively the position or the orientation of the representation. In other embodiments, orientation and position may be tracked, while in yet other cases only one of the two may be tracked regularly while the other may be tracked only upon certain conditions. It is appreciated that either the position or the orientation of the controlling object may change over time and it is therefore possible to derive a trajectory which correlates to the spatial-position or the spatial-orientation of the controlling object as function of time.

The derived trajectory may be interpreted to control the controlled computing device 200. In accordance with certain embodiments, an inertial movement sensor (not shown) may replace or supplement visual sensor 300. The inertial movement sensor may provide spatial data responsive to movements and/or orientation of the controlling object. The inertial measurement-sensor may comprise one or more sensors such as an accelerometer or a gyroscope. The inertial-measurement-sensor may produce data responsive to movements or orientation of the controlling object, thereby enabling determining the spatial-position and or the spatial orientation of the controlling object.

In accordance with various embodiments, controlled computing device 200 may include a display 213. A "spot" as used herein refers to an area with a radius large enough to be visible on display 213 and small enough to enable attributing user intent relative to a particular location within the display.

The controlled computing device may be configured to maintain a location indicator, which marks a selected spot within the presentation area of the device. If the controlled computing device is a general purpose computer, the location indicator may be a cursor or mouse pointer as provided by the operating system of the controlled computing device. If the controlled computing device is a touchscreen enabled device, such as a smartphone or a tablet, the location indicator may be a cursor or pointer provided by the visual control application.

Various embodiments relate to controlling displacement of the location indicator on the display of the controlled computing device in response to movements of the controlling object, broadly referred to as a displacement operation. Various embodiments may further cause the controlled computing device to perform other operations, broadly referred to as command operations, in response to movements of the controlling object. The command operations are distinguishable from the displacement operations. Various embodiments may further distinguish between movement of the controlling object intended to correspond to a displacement operation and movement of the controlling object intended to correspond to a command operation.

The derived trajectory may be indicative of the spatial position of the controlling object, regardless of the spatial orientation and of the posture thereof; and, in other cases, the trajectory is indicative of the spatial orientation of the controlling object, regardless of the spatial position and the posture thereof. Herein, "posture" refers to position of parts of the controlling object with respect to each other, regardless of the spatial location and regardless of the spatial orientation thereof. For example, clenching the fingers affects the posture of the hand, while moving or rotating the hand may be performed without affecting the posture thereof. An exemplary technique for deriving a trajectory based on visual data is explained below in reference to FIG. 6. It should be appreciated that obtaining a trajectory in cases where the sensor-originated data is inertial data, may be implemented by tracking the movements and/or orientations of the controlled object, as indicated in the inertial data.

After the derived trajectory is created/updated, it is analyzed to detect the presence of various categories of trajectory segment: displacement segments, which correspond to a displacement operation; command segments, which correspond to a command operation; and intermediate segments, which indicate a transition from a displacement operation to a command operation. An exemplary technique for detecting an intermediate segment is described below in reference to FIG. 7.

In use, the controlling object may be moving in the field of view of visual sensor 300. As the controlling object moves, sequential image data is captured by a visual data processing unit 400. The sequential image data is analyzed and a portion of the image data that corresponds to the controlling object is identified. The sequential locations of the controlling object within the sequential image data forms derived trajectory. Every time a new set of image data is captured by the visual sensor, new location information for the controlling object may be appended to the derived trajectory.

The derived trajectory then may be periodically analyzed to determine if the recent movements of the controlled device correspond to an intermediate segment, in which case subsequent movement of the controlling object may be interpreted as a command segment. If the recent movements do not correspond to an intermediate segment, then it may be assumed the recent and subsequent movement of the controlling object may be interpreted as a displacement segment.

Accordingly, if the controlling object is a hand of the user, the representation point may be, e.g., the geometric center of the representation of the hand, regardless of the hand's orientation and posture. Accordingly, it should be appreciated that the user may rotate his hand and/or close his fingers, without affecting the spatial position of the representation of the hand.

As described above, visual control application 225 may be utilized for controlling the controlled device 200 to perform a requested operation, responsive to a command segment. First, a command segment is located and identified in the derived trajectory. Locating the command segment involves determining a starting-point and an ending-point of thereof, i.e., a first point in time when the command segment starts, and a second point in time when the command segments ends. In some embodiments, the starting-point of the command segment is indicated by an intermediate segment, which is indicative of a transition from a displacement segment to the command segment. The intermediate segment may be detected as described below. The ending-point of the command segment may be determined, for example, based on the expected duration of the command segment, or by any other method suitable for the case.

After the command segment is located the requested operation must be identified. In some cases, the requested operation is identify as one of a set of potential operations. In some cases, the device may have several modes, and the set of potential operations may be determined based on the current mode of the device. In some embodiments, the requested operation is identified based on a correlation between the command segment and a predetermined command trajectory template. In some embodiments, the predetermined command pattern may be a movement in a predetermined orientation. In some embodiment, each member of the set of potential operations is associated with a respective predetermined command pattern.

Accordingly, the requested operation may be identified by calculating respective correlations between the command segment and the respective predetermine command patterns, and selecting the respective predetermine command pattern with the best respective correlation. In some embodiments, the set of respective predetermined command patterns is a set of movements in different orientations.

Visual Device Control Routine

Figure 5:
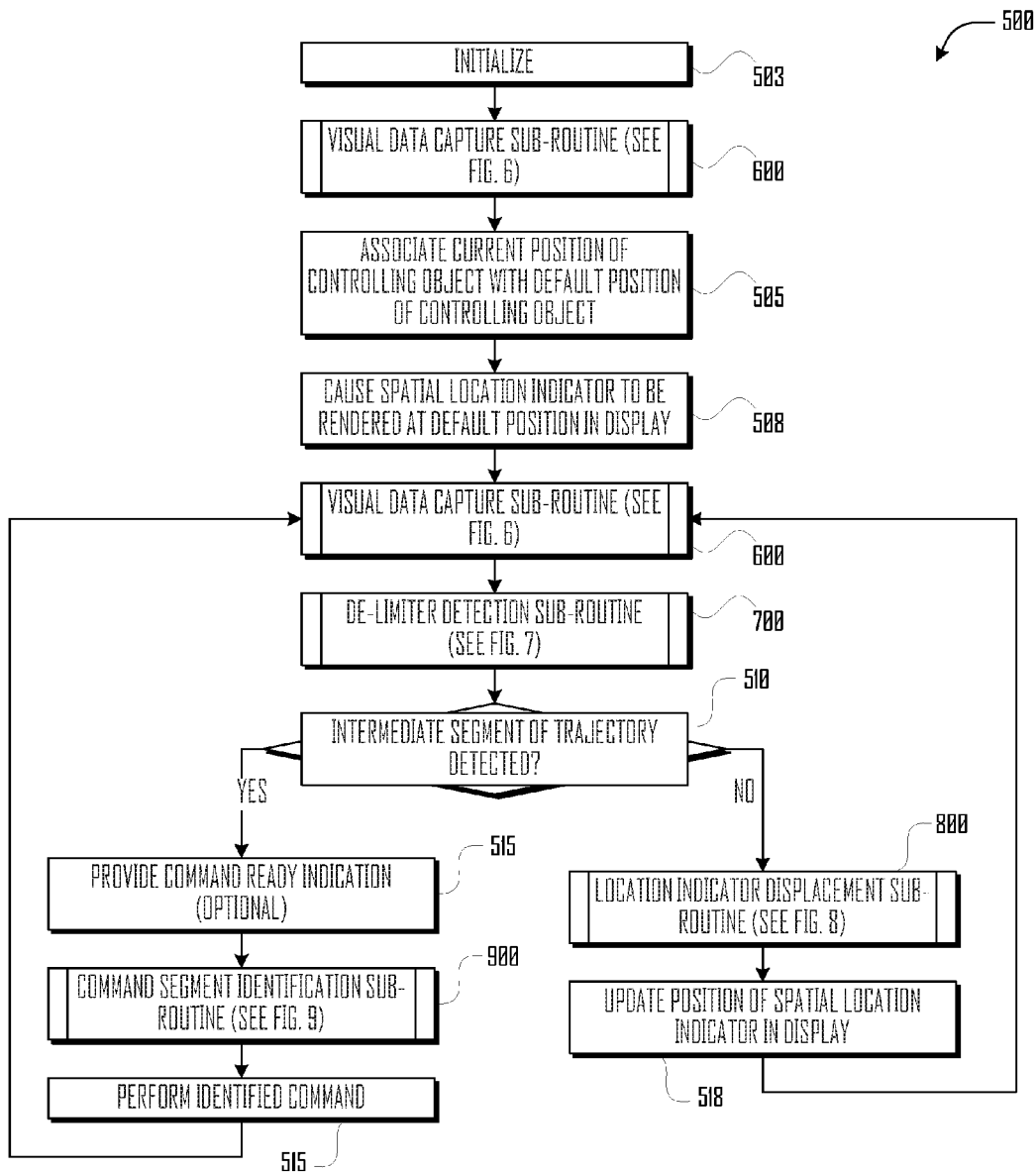
FIG. 5 illustrates a flow diagram of an exemplary visual device control routine in accordance with at least one embodiment.

FIG. 5 illustrates a visual device control routine 500 which may be performed by an instantiation of visual control application 225 operating on a controlled computing device 200.

Visual device control routine 500 is initialized at execution block 503.

Visual device control routine 500 may call a visual data capture sub-routine 600, described below in reference to FIG. 6. Visual data capture sub-routine 600 may provide a derived trajectory segment correlative to movement (or absence of movement) of a controlling object 106 in field of view 104 of a visual sensor 300, e.g. forward-facing camera 300B of controlled computing device 200B.

Visual device control routine 500 may associate the current position of the controlling object relative to the field of view of the visual sensor with a default (or "home") position of the controlling object at execution block 505.

Visual device control routine 500 may cause a spatial location indicator to be rendered at a default (or "home") position on display 213 at execution block 508.

Visual device control routine 500 may then call visual data capture sub-routine 600 again to update the derived trajectory of the controlled object representation.

Visual device control routine 500 may then call a delimiter detection sub-routine 700, described below in reference to FIG. 7. Delimiter detection sub-routine 700 may determine whether the most recent movement of the controlling object, as represented in the derived trajectory, corresponds to an intermediate segment.

At decision block 510, if routine 700 detects an intermediate segment in the derived trajectory of the controlling object, visual device control routine 500 may proceed to optional execution block 513 or call a command segment identification sub-routine 900, described below in reference to FIG. 9 and then proceed to execution block 515; otherwise visual device control routine 500 may call a location indicator displacement sub-routine 800, describe below in reference to FIG. 8, and then proceed to execution block 518.

At optional execution block 513, visual device control routine 500 may provide a "command-ready" signal to indicate to the user a transition of the system into a "command mode," wherein movements of the controlling object are interpreted as commands. The command-ready signal may be a visual signal, an audio signal, and/or any other signal suitable for the case. In some embodiment, command mode may be further associated with a menu presented by the presentation means, which indicates to the user the applicable operations, and the respective predetermined command patterns.

As is described below, command segment identification sub-routine 900 may provide a command identifier to visual device control routine 500 and visual device control routine 500 may perform the command indicated by the command identifier at execution block 515. Visual device control routine 500 may then loop back to call visual data capture sub-routine 600 and repeat the previous steps.

As is described below, location indicator displacement sub-routine 800 may provide a new location indicator displacement value and visual device control routine 500 may update the position of the spatial location indicator on display 213 with the new location indicator displacement value at execution block 518. Visual device control routine 500 may then loop back to call visual data capture sub-routine 600 and repeat the previous steps.

Visual Data Capture Sub-Routine

Figure 6:
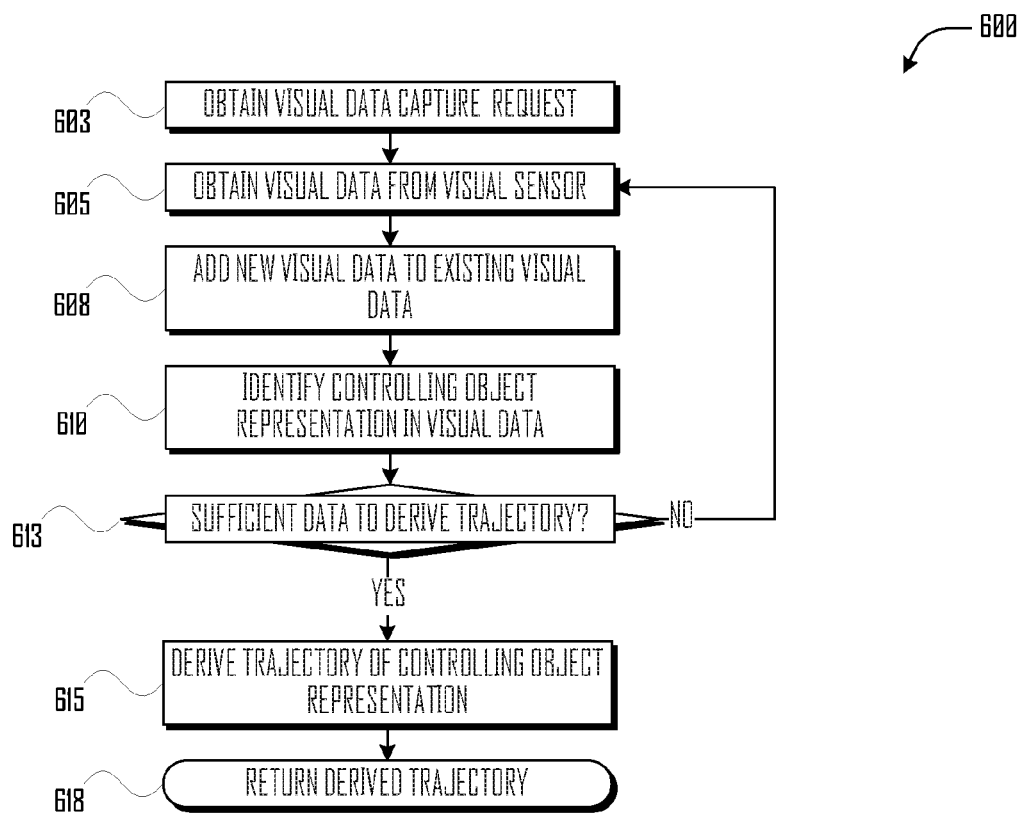
FIG. 6 illustrates a flow diagram of an exemplary visual data capture sub-routine in accordance with at least one embodiment.

FIG. 6 illustrates an exemplary visual data capture sub-routine 600, which may be performed by an instantiation of visual control application 225 operating on a controlled computing device 200 to derive a trajectory correlative to movement (or absence of movement) of a controlling object 106 in field of view 104 of a visual sensor 300, e.g. forward-facing camera 300B of controlled computing device 200B. Visual data capture sub-routine 600 may obtain visual data from visual sensor 300; process the initial series of visual data sets at execution block 508, identify visual data corresponding to a controlling object 106, thereby determining a recognizable visual signature of the controlling object and a current position of the controlling object relative to the field of view of visual sensor.

Visual data capture sub-routine 600 obtains a visual data capture request at execution block 603.

Visual data capture sub-routine 600 obtains visual data from visual sensor 300 at execution block 605. For example, visual data capture sub-routine 600 may obtain video data including a series of image data sets representing sequential images.

Visual data capture sub-routine 600 may identify a portion of the visual data corresponding to the controlling object 106 (the "controlling object representation") at execution block 608. Visual data capture sub-routine 600 may employ conventional techniques for recognizing images of objects in visual data, e.g. the techniques of [Hare et al], [Zhong et al], and the like, to identify the controlling object representation in the visual data.

Visual data capture sub-routine 600 may derive a trajectory of the controlling object representation in the visual data at execution block 610. The trajectory may be expressed, for example, by a series of sequential location values, each corresponding to a relative location of the controlling object representation within an image data set in the series of image data sets. As noted above, the sequential location values may be representative of changes (or an absence of change) in the position and/or the orientation of controlling object 106 relative to visual sensor 300 over time.

When the sequential location values are representative of changes in the position of controlling object 106, the location values may be a single coordinate value within an image data set, e.g. corresponding to a representative point within a controlling object representation, such as the center of the controlling object representation; a set of coordinate values within an image data set, e.g. corresponding to a geometric approximation of the shape of the controlling object; and/or the like.

When the sequential location values are representative of changes in the orientation of controlling object 106, the location values may be a set of coordinate values within an image data set, e.g. a corresponding to an axial line of the controlling object. For example, if the controlling object is a finger of a user, the location values may correspond to the long axis of a finger. As a further example, if the controlling object is the face of a user, the location values may correspond to a line perpendicular to a planar representation of the face. In some cases, the orientation related data may be derived from a three-dimensional representation of the controlling object.

Visual data capture sub-routine 600 may provide the derived trajectory at return block 699.

Delimiter Detection Sub-Routine

Figure 7:
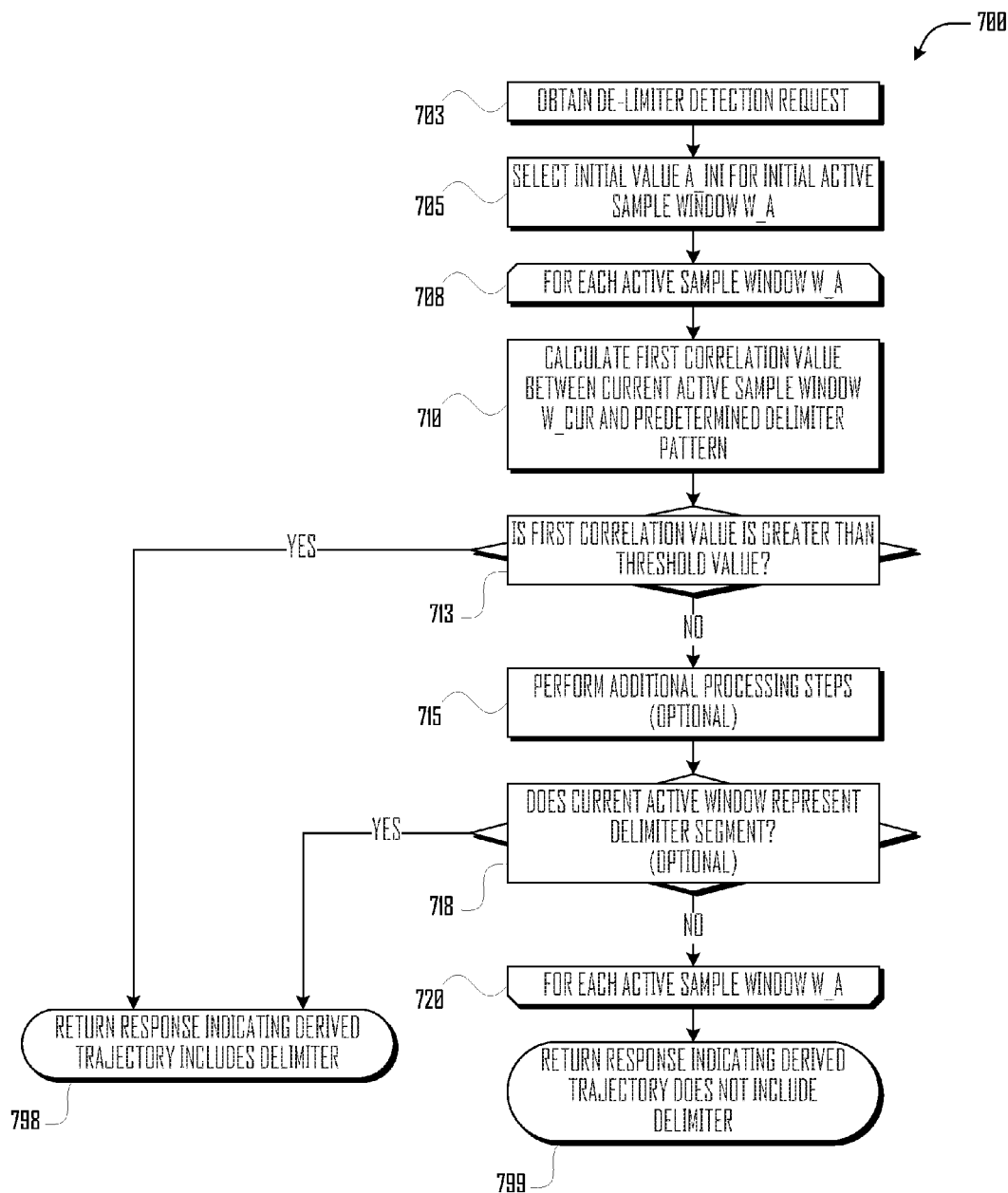
FIG. 7 illustrates a flow diagram of an exemplary delimiter detection sub-routine in accordance with at least one embodiment.

FIG. 7 illustrates an exemplary delimiter detection sub-routine 700, which may be performed by an instantiation of visual control application 225 operating on a controlled computing device 200 to identify a transition between a navigational segment and a command segment in a derived trajectory correlative of movement a controlling object 106 in field of view 104 of a visual sensor 300, e.g. forward-facing camera 300B of controlled computing device 200B. Delimiter detection sub-routine 700 may utilize a "moving window" iterative mechanism to scan a derived trajectory until a delimiter is detected within the current window.

Delimiter detection sub-routine 700 may obtain an intermediate segment identification request, including a derived trajectory $x_{der}$, at execution block 703. A derived trajectory $x_{der}$ of size n may be expressed, for example, by a series of n sequential location values $v_0$-$v_{n-1}$, each location value v may correspond to a relative spatial location of a controlling object representation within a corresponding image data set i in a series of sequential image data sets $i_0$-$i_{n-1}$.

Delimiter detection sub-routine 700 may select an initial value $a_{ini}$ for an initial active sample window $w_a$ within derived trajectory $x_{der}$ at execution block 705. An active sample window $w_a$ of size m may expressed, for example, by a series of m sequential location values $v_a$-$v_{m-1}$ from within the n sequential location values $v_0$-$v_{n-1}$ making up derived trajectory $x_{der}$. The initial value $a_{ini}$ for the initial active sample window $w_a$ may be zero, resulting in an initial active sample window $w_0$ being the series of m sequential location values $v_0$ vm−1. An initial value $a_{ini}$ and or the active sample window size m may be obtained as part of the intermediate segment identification request.

At starting loop block 708, delimiter detection sub-routine 700 may address a series of active sample windows $w_a$ in turn, starting with initial active sample window wini.

Delimiter detection sub-routine 700 may calculate a first correlation value between the current active sample window wcur and a predetermined pattern representing a delimiter, as is described above, at execution block 710. A correlation between two series of location values, e.g. a certain portion of a derived trajectory, such as an active sample window, and a predetermined pattern, may be calculated by any suitable function which indicates the similarity between the two series of location values. For example a correlation may be expressed as the maximum value obtained from calculating the similarity of various alignments between the two time series. Correlation may be calculated by a known per se cross-correlation function, or by any other function suitable for the case.

At decision block 713, if the first correlation value is above a threshold value, indicating the current active window $w_{cur}$ may represent an intermediate segment, delimiter detection sub-routine 700 may proceed to return block 798; otherwise, indicating the current active window may not represent an intermediate segment, delimiter detection sub-routine 700 may proceed to execution block 715.

Depending on the embodiment, delimiter detection sub-routine 700 may perform additional processing steps on the current active window to determine whether the current active window $w_{cur}$ represents an intermediate segment at execution block 715. For example, if the controlled device 200 is being operated within an automobile, e.g., by a driver driving a car, wherein the controlling object is the driver's nose, vibrations may affect the relative positions of the controlled object and the controlling object and the derived trajectory may reflect the vibrations as well as motion of the controlling object. Therefore, if such an operational condition is detected, delimiter detection sub-routine 700 may calculate a second correlation value between the current active sample window $w_{cur}$ and a predetermined pattern representing a stability-compensated delimiter.

At decision block 718, if the results of execution block 715 indicate the current active window $w_{cur}$ represents an intermediate segment, delimiter detection sub-routine 700 may proceed to return block 798; otherwise delimiter detection sub-routine 700 may proceed to ending loop block 720.

At ending loop block 720, delimiter detection sub-routine 700 may loop back to starting loop block 708 and process the next active sample window $w_{a+1}$, if any.

At return block 798, delimiter detection sub-routine 700 may return a response to the intermediate segment identification request, indicating the derived trajectory $x_{der}$ includes an intermediate segment. The response may include the current active window $w_{cur}$ corresponding to the identified intermediate segment.

At return block 799, delimiter detection sub-routine 700 may return a response to the intermediate segment identification request indicating the derived trajectory xcer does not include an intermediate segment.

Location Indicator Displacement Sub-Routine

Figure 8:
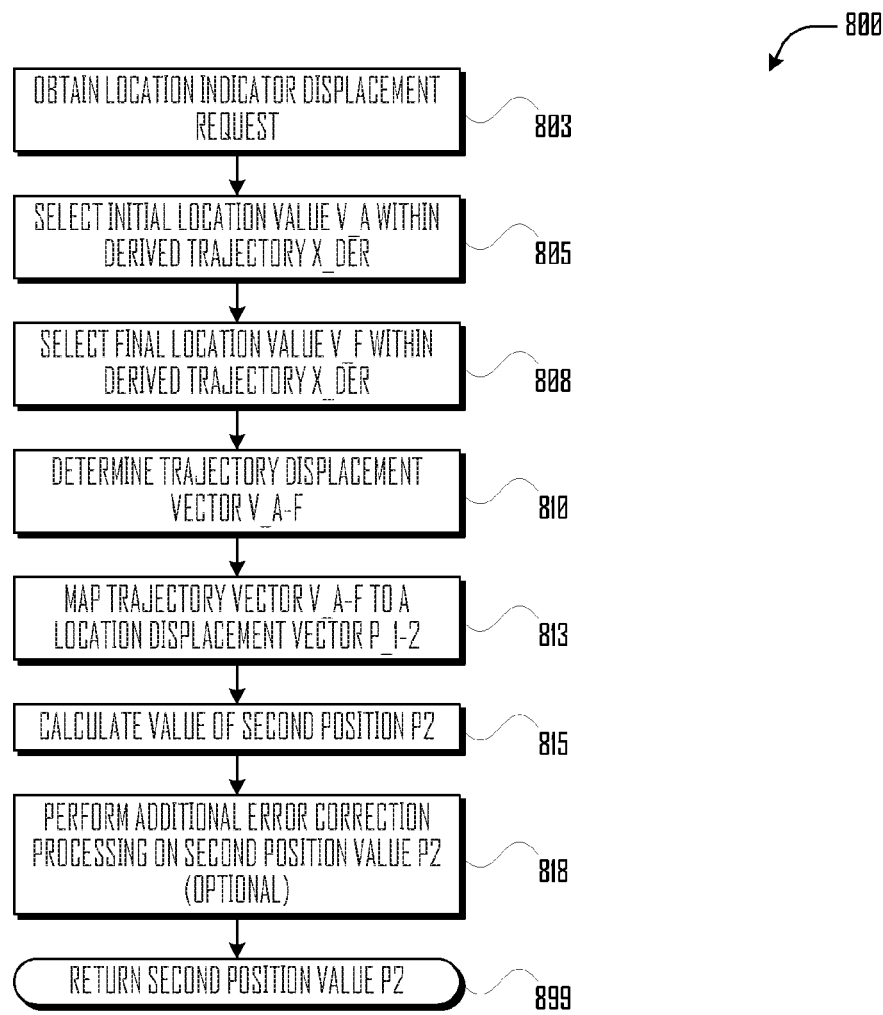
FIG. 8 illustrates a flow diagram of an exemplary location indicator displacement sub-routine in accordance with at least one embodiment.

FIG. 8 illustrates an exemplary location indicator displacement sub-routine 800, which may be performed by an instantiation of visual control application 225 operating on a controlled computing device 200 to determine a spatial displacement of a spatial location indicator being rendered on display 213 between a first display position represented by a first position value p1 and a second display position represented by a second position value p2 corresponding to a derived trajectory segment xseg correlative of movement a controlling object 106 in field of view 104 of a visual sensor 300, e.g. forward-facing camera 300B of controlled computing device 200B.

Location indicator displacement sub-routine 800 may obtain a location indicator displacement request at execution block 803. The location indicator displacement request may include a derived trajectory segment xder and a first position value p1. A position value p may be expressed as a pair of x, y coordinates (px, py). If a first position value p1 is not provided as part of the location indicator displacement request, the first position value p1 may be assigned a value of (0, 0) by default.

Location indicator displacement sub-routine 800 may select an initial location value va within derived trajectory xder at execution block 805.

Location indicator displacement sub-routine 800 may select a final value vf within derived trajectory xder at execution block 808.

Location indicator displacement sub-routine 800 may determine a trajectory displacement vector Va-f at execution block 810. For example, the trajectory displacement vector Va-f may be equal to the initial location value va subtracted from the final location value vf.

Location indicator displacement sub-routine 800 may map the trajectory displacement vector Va-f to a location displacement vector P1-2 at execution block 813. The mapping technique may depend on the relative size and resolution of the image data sets obtained from the visual sensor 300 and display 213, respectively.

Location indicator displacement sub-routine 800 may calculate a value for the second position value p2 by adding the mapped location displacement vector P1-2 to the first position value p1 at execution block 815.

Depending on the embodiment, location indicator displacement sub-routine 800 may perform additional processing steps on the second position value p2 at execution block 818. For example, if the controlled device 200 is being operated within an automobile, e.g., by a driver driving a car, wherein the controlling object is the driver's nose, vibrations may affect the relative positions of the controlled object and the controlling object and the derived trajectory may reflect the vibrations as well as motion of the controlling object. Therefore, if such an operational condition is detected, location indicator displacement sub-routine 800 may utilize a "moving window" iterative mechanism to scan the derived trajectory and determine a displacement error correction vector and combine the displacement error correction vector with the second position value p2 to obtain an error corrected second position value p2.

At return block 899, location indicator displacement sub-routine 800 may return the second position value p2.

Command Segment Identification Sub-routine

Figure 9:
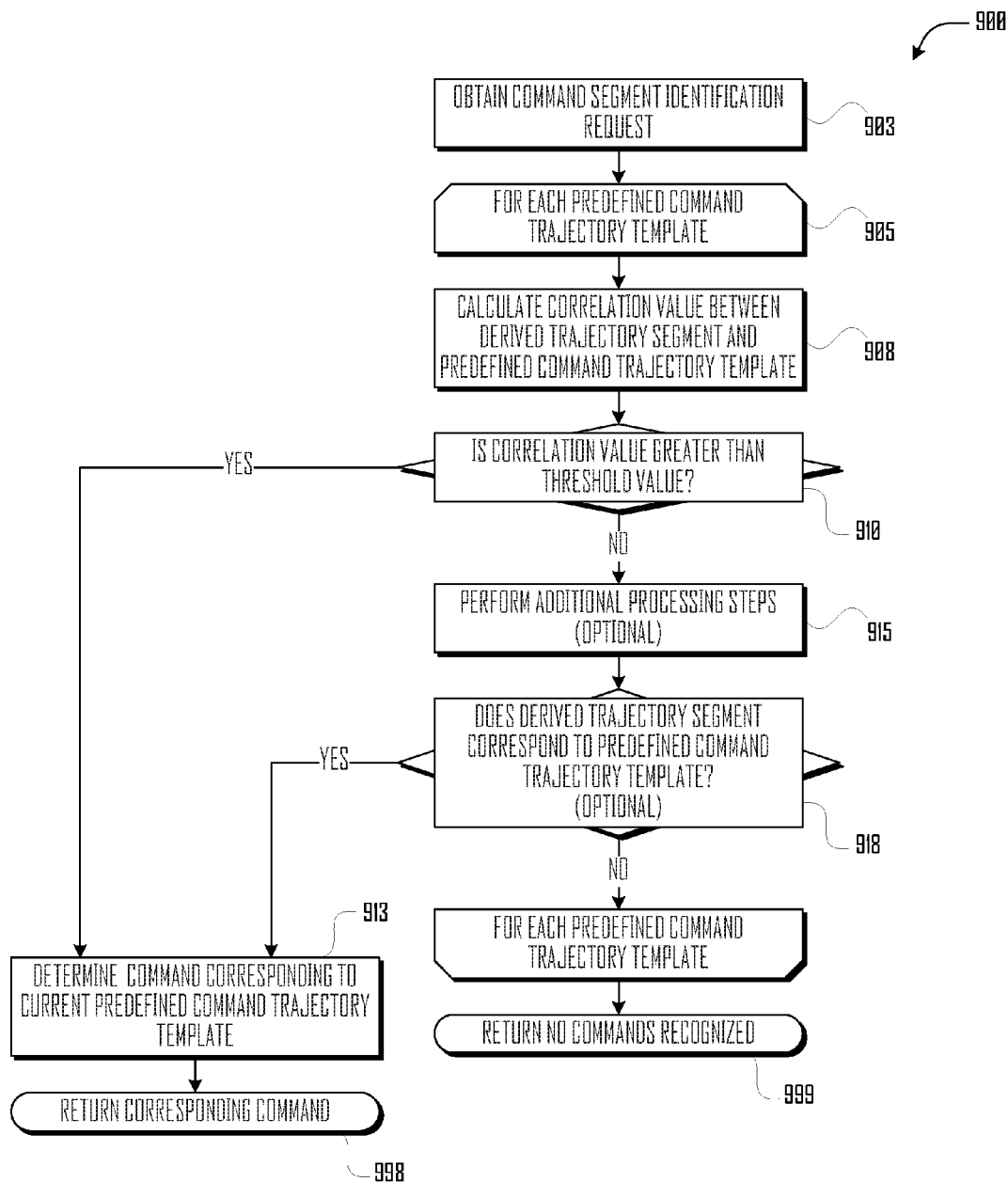
FIG. 9 illustrates a flow diagram of an exemplary command segment identification sub-routine in accordance with at least one embodiment.

FIG. 9 illustrates an exemplary command segment identification sub-routine 900, which may be performed by an instantiation of visual control application 225 operating on a controlled computing device 200 to identify a desired command based on a derived trajectory segment $x_{seg}$ correlative of movement a controlling object 106 in field of view 104 of a visual sensor 300, e.g. forward-facing camera 300B of controlled computing device 200B.

Command segment identification sub-routine 900 may obtain a command segment identification request at execution block 903. The command segment identification request may include a derived trajectory segment $x_{seg}$.

At starting loop block 905, command segment identification sub-routine 900 may iterate through a series of predefined command trajectory templates. The series of predefined command trajectory templates may be context sensitive with respect to the operating state of the controlled computing device 200.

Command segment identification sub-routine 900 may calculate a first correlation value between the derived trajectory segment $x_{seg}$ and the current predefined command trajectory template at execution block 908.

At decision block 910, if the first correlation value is above a threshold value, indicating the derived trajectory segment $x_{seg}$ may correspond to the current predefined command trajectory template, command segment identification sub-routine 900 may proceed to return block 913; otherwise, command segment identification sub-routine 900 may proceed to execution block 915.

Command segment identification sub-routine 900 may determine a controlled device command corresponding to the current predefined command trajectory template at execution block 913.

Command segment identification sub-routine 900 may return a response to the command segment identification request, indicating the controlled device command, at return block 998.

Depending on the embodiment, command segment identification sub-routine 900 may perform additional processing steps on the derived trajectory segment to determine whether the derived trajectory segment corresponds to the current predefined command trajectory template at execution block 915. For example, if the controlled device 200 is being operated within an automobile, e.g., by a driver driving a car, wherein the controlling object is the driver's nose, vibrations may affect the relative positions of the controlled object and the controlling object and the derived trajectory may reflect the vibrations as well as motion of the controlling object. Therefore, if such an operational condition is detected, command segment identification sub-routine 900 may calculate a second correlation value between the derived trajectory segment $x_{seg}$ and the current predefined command trajectory template.

At decision block 918, if the results of execution block 915 indicate derived trajectory segment $x_{seg}$ may correspond to the current predefined command trajectory template, command segment identification sub-routine 900 may proceed to execution block 913; otherwise command segment identification sub-routine 900 may proceed to ending loop block 920.

At ending loop block 920, command segment identification sub-routine 900 may loop back to starting loop block 905 and process the predefined command trajectory template, if any.

At return block 999, command segment identification sub-routine 900 may return a response to the command segment identification request indicating the derived trajectory segment $x_{seg}$ does not include a command segment.

Other Exemplary Embodiments

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein. For example, it was noted before that a controlled device may be controlled responsive to a trajectory, which depends on the spatial-position of the controlling object, or on the spatial orientation thereof, and is not affected by the shape thereof. Therefore, it should be appreciated that a controlled device may be controlled in response to movements of the controlling object, regardless of possible changes in the shape of the controlling object. Furthermore, in some embodiments, a controlled device may be controlled in response to changes in the spatial-position of the controlling object, regardless of possible changes in the spatial-orientation thereof. In some other embodiments, a controlled device may be controlled in response to changes in the spatial orientation of the controlling object, regardless of possible changes in the spatial position thereof, and in yet other embodiments a controlled device may be controlled in response to a combination of possible changes in the spatial-orientation and in the spatial-position of the controlling object.

By way of further example, the controlling object may be a relatively large object, thereby facilitating control of controlled device by a user located relatively far away from the device. In another example, the controlling object may be a light source, for example a flashlight or a laser, thereby facilitating control of a controlled device in a dark environment. In yet another example, the controlling object may be the head of a user, or be attached to the head of the user, thereby enabling controlling controlled device "hands-free."

By way of further example, although the sensor-originated data in general, and positional data in particular, has been described as two-dimensional (2D), three-dimensional sensors and/or three-dimensional controlled object representations may be used in accordance with the various embodiments described above. For example, the three-dimensional representation may be comprised in a three-dimensional visual data received from a three-dimensional visual sensor. In some cases, the three-dimensional representation may be obtained by stereoscopic combination of visual data received from two (2) two-dimensional visual sensors. In some cases, a three-dimensional representation may be obtained from comparing a two-dimensional representation of the controlling object with a three-dimensional model thereof.

What is claimed is:

1. A computing device comprising:
a computer processing unit;
a display having a displayable area and in data communication with said computer processing unit;
a visual sensor having a field of view and in data communication with said computer processing unit;
a user input in data communication with said computer processing unit; and
memory in data communication with said computer processing unit, and the computing device configured to:
sense, by said visual sensor, a first sequential plurality of image data sets, said first sequential plurality of image data sets including a first image data set and a second image data set and providing said first sequential plurality of image data sets to said memory;
process, by said computer processing unit, said first sequential plurality of image data sets to:
identify a controlled object representation in said first image data set and in said second image data set;
derive a continuous trajectory of said controlled object representation using said first sequential plurality of image data sets;
compare a first trajectory segment of said continuous trajectory of said controlled object representation to a predefined delimiter pattern to obtain a first correlation value;
determine said first correlation value exceeds a threshold value;
match a second trajectory segment of said continuous trajectory of said controlled object representation to a predefined command pattern template of a plurality of predefined command pattern templates;
identify a command associated with said predefined command pattern template of said plurality of predefined command pattern templates; and
perform said command;
obtain, by said user input, a first location value and providing said first location value to said memory;
process, by said computer processing unit, said first location value to determine a first location within said displayable area corresponding to said first location value;
obtain, by said visual sensor, a second sequential plurality of image data sets from said visual sensor, said second sequential plurality of image data sets including a third image data set and providing said second sequential plurality of image data sets to said memory; and
process, by said computer processing unit, said second sequential plurality of image data sets to:
identify said controlled object representation in said third image data set;

extend said continuous trajectory of said controlled object representation using said second sequential plurality of image data sets;

compare a third trajectory segment of said continuous trajectory of said controlled object representation to said predefined delimiter pattern to obtain a second correlation value;

determine said second correlation value does not exceed said threshold value;

determine a trajectory displacement value of a fourth trajectory segment of said continuous trajectory of said controlled object representation, said fourth trajectory segment of said continuous trajectory of said controlled object representation including said third trajectory segment;

map said trajectory displacement value to a display displacement value; and combine said first location value and said display displacement value to obtain a second location value, said second location value corresponding to a second location within said displayable area.

2. The computing device of claim 1, wherein said continuous trajectory of said controlled object representation is correlative to movement over time of a controlling object in said field of view of said visual sensor.

3. The computing device of claim 2, wherein said continuous trajectory of said controlled object representation includes a sequential plurality of spatial position markers, each spatial position marker of said sequential plurality of spatial position markers representing a spatial position of said controlled object representation in an image data set obtained from said visual sensor.

4. The computing device of claim 3, the computing device being further configured to:

process, by said computer processing unit, said continuous trajectory of said controlled object representation to:

identify an end-point of said first trajectory segment, said end-point of said first trajectory segment being a first spatial position marker of said sequential plurality of spatial position markers and identify a start-point of said second trajectory segment, said start-point of said second trajectory segment being a second spatial position marker of said sequential plurality of spatial position markers; and wherein said first spatial position marker is adjacent to said second spatial position marker in said sequential plurality of spatial position markers.

5. The computing device of claim 3, wherein each spatial position marker of said sequential plurality of spatial position markers includes a coordinate pair having a horizontal component and a vertical component.

6. The computing device of claim 3, wherein each of said sequential plurality of spatial position markers includes a vector having a magnitude component and an angle component.

7. The computing device of claim 1, wherein said visual sensor includes a camera.

8. The computing device of claim 1, wherein said predefined delimiter pattern is correlative to a predefined path of a controlling object in said field of view of said visual sensor.

9. The computing device of claim 1, further comprising a housing, said housing defining an interior space and having a front side, said front side being formed with a first opening and a second opening, and wherein:

said memory and said computer processing unit are disposed within said interior space;

said display in disposed at least partially within said interior space with said displayable area being oriented towards said first opening;

said visual sensor includes a lens; and said visual sensor is disposed at least partially within said interior space with said lens being oriented towards said second opening.

10. A system useful in facilitating remote control of a computing device, the computing device including a display having a displayable area and a user input, the system comprising:

a computer processing unit;

a visual sensor in data communication with said computer processing unit; and memory in data communication with said computer processing unit, and the system configured to:

sense, by said visual sensor, a first sequential plurality of image data sets, said first sequential plurality of image data sets including a first image data set and a second image data set and providing said first sequential plurality of image data sets to said memory;

process, by said computer processing unit, said first sequential plurality of image data sets to:

identify a controlled object representation in said first image data set and in said second image data set;

derive a continuous trajectory of said controlled object representation using said first sequential plurality of image data sets;

compare a first trajectory segment of said continuous trajectory of said controlled object representation to a predefined delimiter pattern to obtain a first correlation value;

determine said first correlation value exceeds a threshold value;

match a second trajectory segment of said continuous trajectory of said controlled object representation to a predefined command pattern template of a plurality of predefined command pattern templates;

identify a command associated with said predefined command pattern template of said plurality of predefined command pattern templates; and provide said command to the computing device;

obtain, from the user input of the computing device, a first location value and providing said first location value to said memory;

process, by said computer processing unit, said first location value to determine a first location within the displayable area of the display of the computing device corresponding to said first location value;

obtain, by said visual sensor, a second sequential plurality of image data sets from said visual sensor, said second sequential plurality of image data sets including a third image data set and providing said second sequential plurality of image data sets to said memory; and process, by said computer processing unit, said second sequential plurality of image data sets to:

identify said controlled object representation in said third image data set;

extend said continuous trajectory of said controlled object representation using said second sequential plurality of image data sets;

compare a third trajectory segment of said continuous trajectory of said controlled object representation to said predefined delimiter pattern to obtain a second correlation value;

determine said second correlation value does not exceed said threshold value;

determine a trajectory displacement value of a fourth trajectory segment of said continuous trajectory of said controlled object representation, said fourth trajectory segment of said continuous trajectory of said controlled object representation including said third trajectory segment;

map said trajectory displacement value to a display displacement value; and combine said first location value and said display displacement value to obtain a second location value, said second location value corresponding to a second location within said displayable area.

11. The system of claim 10, wherein said continuous trajectory of said controlled object representation is correlative to movement over time of a controlling object in said field of view of said visual sensor.

12. The system of claim 11, wherein said continuous trajectory of said controlled object representation includes a sequential plurality of spatial position markers, each spatial position marker of said sequential plurality of spatial position markers representing a spatial position of said controlled object representation in an image data set obtained from said visual sensor.

13. The system of claim 12, the system being further configured to:

process, by said computer processing unit, said continuous trajectory of said controlled object representation to:

identify an end-point of said first trajectory segment, said end-point of said first trajectory segment being a first spatial position marker of said sequential plurality of spatial position markers and identify a start-point of said second trajectory segment, said start-point of said second trajectory segment being a second spatial position marker of said sequential plurality of spatial position markers; and wherein said first spatial position marker is adjacent to said second spatial position marker in said sequential plurality of spatial position markers.

14. The system of claim 12, wherein each spatial position marker of said sequential plurality of spatial position markers includes a coordinate pair having a horizontal component and a vertical component.

15. The system of claim 12, wherein each of said sequential plurality of spatial position markers includes a vector having a magnitude component and an angle component.

16. The system of claim 10, wherein said visual sensor includes a camera.

17. The system of claim 10, wherein said predefined delimiter pattern is correlative to a predefined path of a controlling object in said field of view of said visual sensor.

18. The system of claim 10, further comprising a housing, said housing defining an interior space and having a front side, said front side being formed with a first opening and a second opening, and wherein:

said memory and said computer processing unit are disposed within said interior space;

said display in disposed at least partially within said interior space with said displayable area being oriented towards said first opening;

said visual sensor includes a lens; and said visual sensor is disposed at least partially within said interior space with said lens being oriented towards said second opening.

* * * * *